United States Patent
Thornton et al.

(10) Patent No.: US 7,448,327 B2
(45) Date of Patent: *Nov. 11, 2008

(54) SUSPENDING, GUIDING AND PROPELLING VEHICLES USING MAGNETIC FORCES

(75) Inventors: Richard D. Thornton, Concord, MA (US); Tracy M. Clark, Bedford, MA (US)

(73) Assignee: Magnemotion, Inc., Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/327,998

(22) Filed: Jan. 9, 2006

(65) Prior Publication Data

US 2006/0130699 A1 Jun. 22, 2006

Related U.S. Application Data

(63) Continuation of application No. 10/676,726, filed on Oct. 1, 2003, now Pat. No. 6,983,701, and a continuation-in-part of application No. 10/262,541, filed on Oct. 1, 2002, now Pat. No. 6,917,136.

(60) Provisional application No. 60/415,013, filed on Oct. 1, 2002, provisional application No. 60/326,278, filed on Oct. 1, 2001.

(51) Int. Cl.
*B60L 13/04* (2006.01)
*H02K 41/02* (2006.01)

(52) U.S. Cl. .................... 104/282; 310/12; 310/90.5

(58) Field of Classification Search ......... 104/281–284; 310/12, 90.5; 505/902–905
See application file for complete search history.

(56) References Cited

U.S. PATENT DOCUMENTS 3,029,893 A 4/1962 Mountjoy (Continued)

FOREIGN PATENT DOCUMENTS

DE 2532269 2/1977

(Continued)

OTHER PUBLICATIONS

Eghtesadi, M. "Inductive Power Transfer to an Electric Vehicle-Analytical Model," 40th IEEE Vehicular Technology Conference (May 6-9, 1990) Orlando, FL, pp. 100-104.

(Continued)

*Primary Examiner*—Burton Mullins
(74) *Attorney, Agent, or Firm*—Nutter McClennen & Fish LLP; David J. Powsner; Benjamin E. Berman

(57) ABSTRACT

Magnetic levitation methods and apparatus use arrays of vehicle magnets to provide three forces: suspension, guidance and propulsion. The magnets, which can be permanent magnets or superconducting magnets operating in the persistent current mode, have associated control coils that allow the magnets to provide a controllable attractive force to a laminated steel rail. The control coils adjust the gap between the magnets and the rails so as to be in stable equilibrium without requiring significant power dissipation in the control coils. These same magnets and steel rails also provide lateral guidance to keep the vehicle on the track and steer the vehicle on turns. The suspension control coils can provide lateral damping by means of offset magnets in the suspension arrays. Windings in transverse slots in the steel rails are excited with currents that react against the field produced by the vehicle magnets to create vehicle propulsion. The magnet size is adjusted to provide negligible cogging force even when there are as few as three winding slots per wavelength along the rail. Means are used to mitigate end effects so that a multiplicity of magnet pods can be used to support the vehicle.

11 Claims, 9 Drawing Sheets

U.S. PATENT DOCUMENTS

| | | | |
|---|---|---|---|
| 3,440,600 A | 4/1969 | Frech et al. | |
| 3,532,934 A | 10/1970 | Ballman | |
| 3,609,676 A | 9/1971 | Jauquet et al. | |
| 3,617,890 A | 11/1971 | Kurauchi et al. | |
| 3,628,462 A | 12/1971 | Holt | |
| 3,636,508 A | 1/1972 | Ogilvy et al. | |
| 3,638,093 A | 1/1972 | Ross | |
| 3,679,874 A | 7/1972 | Fickenscher | |
| 3,768,417 A | 10/1973 | Thornton et al. | |
| 3,772,640 A | 11/1973 | Auer, Jr. et al. | |
| 3,786,411 A | 1/1974 | Kurauchi et al. | |
| 3,834,318 A | 9/1974 | Fellows et al. | |
| 3,842,751 A | 10/1974 | Thornton et al. | |
| 3,845,720 A | 11/1974 | Bohn et al. | |
| 3,847,088 A | 11/1974 | Karch | |
| 3,850,108 A | 11/1974 | Winkle | |
| 3,858,521 A | 1/1975 | Atherton | |
| 3,860,300 A | 1/1975 | Lyman | |
| 3,860,843 A | 1/1975 | Kawasaki et al. | |
| 3,871,301 A * | 3/1975 | Kolm et al. | 104/292 |
| 3,874,299 A | 4/1975 | Silva et al. | |
| 3,882,789 A | 5/1975 | Simon et al. | |
| 3,899,979 A | 8/1975 | Godsey, Jr. | |
| 3,906,436 A | 9/1975 | Kurauchi et al. | |
| 3,912,992 A * | 10/1975 | Lamb | 104/292 |
| 3,927,735 A | 12/1975 | Miericke et al. | |
| 3,937,148 A | 2/1976 | Simpson | |
| 3,979,091 A | 9/1976 | Gagnon et al. | |
| 4,023,753 A | 5/1977 | Dobler | |
| 4,061,089 A | 12/1977 | Sawyer | |
| 4,065,706 A | 12/1977 | Gosling et al. | |
| 4,088,379 A | 5/1978 | Perper | |
| 4,132,175 A | 1/1979 | Miller et al. | |
| 4,140,063 A | 2/1979 | Nakamura | |
| 4,292,465 A | 9/1981 | Wilson et al. | |
| 4,361,202 A | 11/1982 | Minovitch | |
| 4,424,463 A | 1/1984 | Musil | |
| 4,441,604 A | 4/1984 | Schlig et al. | |
| 4,522,128 A | 6/1985 | Anderson | |
| 4,646,651 A | 3/1987 | Yamamura et al. | |
| 4,665,829 A | 5/1987 | Anderson | |
| 4,665,830 A | 5/1987 | Anderson et al. | |
| 4,671,185 A | 6/1987 | Anderson et al. | |
| 4,698,895 A | 10/1987 | Miller et al. | |
| 4,711,182 A | 12/1987 | Alexandrov et al. | |
| 4,726,299 A | 2/1988 | Anderson | |
| 4,776,464 A | 10/1988 | Miller et al. | |
| 4,794,865 A | 1/1989 | Lindberg | |
| 4,800,328 A | 1/1989 | Bolger et al. | |
| 4,811,667 A | 3/1989 | Morishita et al. | |
| 4,836,344 A | 6/1989 | Bolger | |
| 4,847,526 A | 7/1989 | Takehara et al. | |
| 4,914,539 A | 4/1990 | Turner et al. | |
| 4,953,470 A | 9/1990 | Yamaguchi | |
| 4,972,779 A * | 11/1990 | Morishita et al. | 104/284 |
| 5,032,746 A | 7/1991 | Ueda et al. | |
| 5,032,747 A | 7/1991 | Sakamoto | |
| 5,108,052 A | 4/1992 | Malewicki et al. | |
| 5,126,606 A | 6/1992 | Hofmann | |
| 5,152,227 A | 10/1992 | Kato | |
| 5,161,758 A | 11/1992 | Shuto | |
| 5,178,037 A | 1/1993 | Mihirogi | |
| 5,180,041 A | 1/1993 | Shuto | |
| 5,193,767 A | 3/1993 | Mihirogi | |
| 5,199,674 A | 4/1993 | Mihirogi | |
| 5,214,323 A | 5/1993 | Ueda et al. | |
| 5,214,981 A | 6/1993 | Weinberger et al. | |
| 5,225,726 A | 7/1993 | Tozoni | |
| 5,242,136 A | 9/1993 | Cribbens et al. | |
| 5,247,890 A | 9/1993 | Mihirogi | |
| 5,251,563 A | 10/1993 | Staehs et al. | |
| 5,263,670 A | 11/1993 | Colbaugh et al. | |
| 5,267,514 A | 12/1993 | Staehs et al. | |
| 5,277,124 A | 1/1994 | DiFonso et al. | |
| 5,277,125 A | 1/1994 | DiFonso et al. | |
| 5,293,308 A | 3/1994 | Boys et al. | |
| 5,325,974 A | 7/1994 | Staehs | |
| 5,370,059 A * | 12/1994 | Raschbichler et al. | 104/124 |
| 5,409,095 A | 4/1995 | Hoshi et al. | |
| 5,435,429 A | 7/1995 | Van Den Goor | |
| 5,444,341 A | 8/1995 | Kneifel, II et al. | |
| 5,450,305 A | 9/1995 | Boys et al. | |
| 5,452,663 A | 9/1995 | Berdut | |
| 5,467,718 A | 11/1995 | Shibata et al. | |
| 5,517,924 A | 5/1996 | He et al. | |
| 5,519,266 A | 5/1996 | Chitayat | |
| 5,521,451 A | 5/1996 | Oudet et al. | |
| 5,523,637 A | 6/1996 | Miller | |
| 5,528,113 A | 6/1996 | Boys et al. | |
| 5,551,350 A | 9/1996 | Yamada et al. | |
| 5,573,090 A | 11/1996 | Ross | |
| 5,590,604 A | 1/1997 | Lund | |
| 5,590,995 A | 1/1997 | Berkers et al. | |
| 5,592,158 A | 1/1997 | Riffaud | |
| 5,595,121 A | 1/1997 | Elliott et al. | |
| 5,619,078 A | 4/1997 | Boys et al. | |
| 5,642,013 A | 6/1997 | Wavre | |
| 5,708,427 A | 1/1998 | Bush | |
| 5,709,291 A | 1/1998 | Nishino et al. | |
| 5,720,454 A | 2/1998 | Bachetti et al. | |
| 5,722,326 A | 3/1998 | Post | |
| 5,723,917 A | 3/1998 | Chitayat | |
| 5,757,100 A | 5/1998 | Burgbacher | |
| 5,757,288 A | 5/1998 | Dixon et al. | |
| 5,821,638 A | 10/1998 | Boys et al. | |
| 5,839,554 A | 11/1998 | Clark | |
| 5,898,579 A | 4/1999 | Boys et al. | |
| 5,900,728 A | 5/1999 | Moser et al. | |
| 5,904,101 A | 5/1999 | Kuznetsov | |
| 5,906,647 A | 5/1999 | Zyburt et al. | |
| 5,910,691 A | 6/1999 | Wavre | |
| 5,927,657 A | 7/1999 | Takasan et al. | |
| 5,952,743 A | 9/1999 | Sidey | |
| 5,990,592 A | 11/1999 | Miura et al. | |
| 6,005,511 A | 12/1999 | Young et al. | |
| 6,008,552 A | 12/1999 | Yagoto et al. | |
| 6,011,508 A | 1/2000 | Perreault et al. | |
| 6,025,659 A | 2/2000 | Nashiki | |
| 6,032,110 A | 2/2000 | Ishihara et al. | |
| 6,034,499 A | 3/2000 | Tranovich | |
| 6,044,770 A | 4/2000 | Davey et al. | |
| 6,064,301 A | 5/2000 | Takahashi et al. | |
| 6,081,058 A | 6/2000 | Suzuki et al. | |
| 6,087,742 A | 7/2000 | Maestre et al. | |
| 6,089,512 A | 7/2000 | Ansorge et al. | |
| 6,100,821 A | 8/2000 | Tanji et al. | |
| 6,101,952 A | 8/2000 | Thornton et al. | |
| 6,104,117 A | 8/2000 | Nakamura et al. | |
| 6,137,424 A | 10/2000 | Cohen et al. | |
| 6,225,919 B1 | 5/2001 | Lumbis et al. | |
| 6,242,822 B1 | 6/2001 | Strothmann et al. | |
| 6,286,434 B1 | 9/2001 | Fischperer et al. | |
| 6,376,957 B1 | 4/2002 | Haydock et al. | |
| 6,418,857 B1 * | 7/2002 | Okano et al. | 104/281 |
| 6,499,701 B1 | 12/2002 | Thornton et al. | |
| 6,534,894 B1 | 3/2003 | Flowerday | |
| 6,684,794 B2 | 2/2004 | Fiske et al. | |
| 6,781,524 B1 | 8/2004 | Clark et al. | |
| 6,983,701 B2 * | 1/2006 | Thornton et al. | 104/282 |
| 2005/0242675 A1 | 11/2005 | Thornton et al. | |

| | | | |
|---|---|---|---|
| 2005/0263369 | A1 | 12/2005 | Mendenhall |

FOREIGN PATENT DOCUMENTS

| | | |
|---|---|---|
| DE | 27 10 156 A1 | 9/1978 |
| DE | 235 786 A3 | 5/1986 |
| DE | 4114706 | 10/1992 |
| DE | 195 35 856 A1 | 3/1997 |
| DE | 10000513 | 9/2005 |
| EP | 0 482 424 B1 | 5/1986 |
| EP | 0 229 669 | 7/1987 |
| EP | 0740405 A1 | 10/1996 |
| EP | 1 283 586 | 2/2003 |
| JP | 59 153457 A | 9/1984 |
| JP | 63-310357 | 12/1988 |
| JP | 1-136504 | 5/1989 |
| JP | 8-129336 | 5/1996 |
| JP | 8-205514 | 8/1996 |
| KR | 91-4927 | 3/1991 |
| SU | 1140212 A | 2/1985 |
| WO | WO-95/21405 | 8/1995 |
| WO | WO 01/96139 | 12/2001 |

OTHER PUBLICATIONS

Stevens, Bruce W. "Asynchronous Bidirectional Network Interface Enabling Seamless Concurrent Processing in a Distributed Heterogeneous Multiprocessor System," Serial No. 783,661, Filing Date Oct. 28, 1991, Office of the Chief of Naval Research.

Hughes, Austin. *Electric Motors and Drives* (Newnes: Oxford, 1990), Table of Contents (pp. v-xiii), Chapter 9 "Synchronous, Switched Reluctance and Brushless D.C. Drives," (pp. 293-315).

Basak, Amitava. *Permanent-Magnet DC Linear Motors* (Clarendon Press: Oxford, 1996), Table of Contents (pp. ix-xi), Chapter 2 "Types of DC Linear Motor" (pp. 21-41) and Chapter 5 "Supports and Guidance" (pp. 90-104).

Gieras, Jacek F. et al. *Linear Synchronous Motors: Transportation and Automation Systems*(CRC Press: New York, 2000), Table of Contents, Chapter 6 "High Speed Maglev Transport" (pp. 177-215).

Koh, Chang Seop, "New Cogging-Torque Reduction Method for Brushless Permanent-Magnet Motors", IEEE Transactions on Magnetics, vol. 39, No. 6, Nov. 2003, pp. 3503-3506.

Zyl, AW van and CF Landy, "Reduction of Cogging Forces in a Tubular Linear Synchronous Motor by Optimising the Secondary Design", IEEE Africon, pp. 689-692 (2002).

Zhu, Z.Q., et al., "Reduction of cogging force in slotless linear permanent magnet motors", IEE Proc.-Electr. Power Appl., vol. 144, No. 4, Jul. 1997, pp. 277-282.

Zhu, Z.Q., et al., "Novel Linear Tubular Brushless Permanent Magnet Motor", EMD97, 1-3, Sep. 1997, Conference Publication No. 444, IEE 1997, pp. 91-95.

Breton, C., et al., "Influence of Machine Symmetry on Reeduction of Cogging Torque in Permanent-Magnet Brushless Motors", IEEE Transactions on Magnetics, vol. 36, No. 5, Sep. 2000, pp. 3819-3823.

Li, Touzhu and Gordon Slemon, "Reduction of Cogging Torque in Permanent Magnet Motors", IEEE Transactions on Magnetics, vol. 24, No. 6, Nov. 1988, pp. 2901-2903.

van Zyl et al., "Novel SEcondary Design for a Linear Synchronous Motor Using a Split-Pole Magnet Arrangement", AFRICON, 1999 IEEE, vol. 2, Sep. 28-Oct. 1, 1999, pp. 627-630.

Ackermann et al., "New Technique for Reduing Torque in a Class of Brushless DC Motors", IEE Proceedings-B, vol. 139, No. 4, Jul. 1992.

Hwang et al., "Various Design Techniques to Reduce Cogging Torque by Controlling Energy Variation in Permanent Magnet Motors", IEEE Transactions on Magnetics, vol. 37, No. 4, Jul. 2001.

Hendershot et al., "Design of Brushless Permanent-Magnet Motors", pp. 3-48 to 3-67 and 5-28, Magna Physics Publ. & Clarendon Press, Oxford, 1994.

Supplemental European Search Report, Issued Mar. 12, 2007, European Application No. 03774513.0

* cited by examiner

SUSPENDING, GUIDING AND PROPELLING VEHICLES USING MAGNETIC FORCES

This application is a continuation of U.S. application Ser. No. 10/676,726, filed Oct. 1, 2003, entitled "Suspending Guiding and Propelling Vehicles Using Magnetic Forces" (the teachings of which are incorporated herein by reference), which claims the benefit of priority of U.S. Provisional Application Ser. No. 60/415,013, filed Oct. 1, 2002, entitled "Suspending, Guiding and Propelling Vehicles Using Magnetic Forces", and is a continuation-in-part of U.S. application Ser. No. 10/262,541, filed Oct. 1, 2002, entitled "Synchronous Machine Design and Manufacturing", which claims the benefit of U.S. Provisional Application Ser. No. 60/326,278, filed Oct. 1, 2001, entitled "Synchronous Machine Design and Manufacturing." The teachings of the foregoing applications are incorporated herein by reference.

BACKGROUND OF THE INVENTION

This invention pertains to magnetic levitation ("maglev") transportation systems and methods, and more particularly, those for suspending, guiding and propelling vehicles using magnetic forces.

The use of magnetic forces to suspend, guide and propel vehicles has been extensively researched and several full size demonstration prototypes have been built. In spite of proven advantages, such as fast, comfortable, quiet and efficient operation, maglev has been perceived as expensive and primarily suited for very high speed operation. Applications for urban use have been limited by the ability of proposed designs to compete effectively with conventional guided systems such as rapid transit, light rail, monorail, commuter rail and express busways.

Virtually all maglev designs that have been seriously considered for transportation applications can be characterized as either ElectroDynamic Suspension (EDS) or ElectroMagnetic Suspension (EMS). EDS designs use forces created by interaction of induced currents with the changing magnetic field that produced the currents while EMS designs use attractive force of a magnet to a ferromagnetic structure. Both EDS and EMS designs have been built and tested to the point where they are known to be viable to speeds of more than 150 m/s (336 mph, 540 km/h).

Each design has certain advantages and disadvantages. EDS has the virtue that it can operate with a larger magnetic gap than EMS but has the fundamental disadvantage that it creates high drag at low speeds and provides no suspension force when stopped. On the other hand, EMS has the advantage that it can operate very well at low speeds but has the disadvantage that the magnetic gap must be less than gaps that are practical with EDS designs.

The Japanese high speed test track has shown that an EDS system with a gap of 100 mm can achieve speeds of at least 150 m/s (353 mph) and the German Transrapid EMS test track has demonstrated reliable operation with a gap of 10 mm at speeds of 125 m/s (280 mph). For urban applications it appears that EMS has a major advantage and if the magnetic gap can be increased it would appear to have an even greater advantage for both low and high speed designs.

There is considerable prior art disclosed in existing patents and is instructive to review them in order to appreciate how the invention disclosed here is different from and an improvement on the prior art.

U.S. Pat. No. 3,638,093 (Magnetic suspension and propulsion system; James Ross; Issued Jan. 25, 1972) is an early example of a design that combines suspension and propulsion. This patent also references several of the important older patents dating to 1889. The design requires that power be transferred to the vehicle in order to propel it and the suspension requires substantial power because it does not use permanent magnets.

U.S. Pat. No. 3,842,751 (Transportation system employing an electromagnetically suspended, guided and propelled vehicle; Inventors: Richard Thornton, Henry Kolm; Issued: Oct. 22, 1974) shows how to use a single set of superconducting or permanent magnets to suspend, guide and propel a vehicle but is based on EDS technology so there is no necessity of controlling an otherwise unstable suspension. This design requires the use of wheels for low speed operation and because of the high low speed drag is not well suited to low speed operation.

U.S. Pat. No. 3,860,300 (Virtually zero powered magnetic suspension; Inventor: Joseph Lyman; Issued Jan. 14, 1975) shows how to use permanent magnets in a suspension system but the design is for a magnetic bearing and requires entirely separate structures for the permanent magnets and the electromagnets. It does not address the issue of guidance or propulsion.

U.S. Pat. No. 3,937,148 (Virtually zeros power linear magnetic bearing; Inventor: Paul A. Simpson; Issued: Feb. 10, 1976) shows how the patent 3,860,300 can be used for transportation applications but requires separate electromagnets and does not address the issues of guidance and propulsion.

U.S. Pat. No. 4,088,379 (Variable permanent magnet suspension system; Inventor: Lloyd Perper; Issued: May 9, 1978) builds on the ideas in U.S. Pat. No. 3,860,300 but it is not directly applicable to maglev using EMS.

U.S. Pat. No. 5,722,326 (Magnetic Levitation system for moving objects; Inventor: Richard Post; Issued Mar. 3, 1998) is a variation on U.S. Pat. No. 3,842,751 that uses Halbach arrays of permanent magnets. It is specific to EDS and does not teach how to use permanent magnets in an EMS design.

U.S. Pat. No. 6,860,300 (Virtually zero powered magnetic suspension; Inventor: Joseph Lyman; Issued Jan. 14, 1975) teaches how permanent magnets can be used to provide magnetic suspension but the design disclosed requires separate electromagnets and is not readily applicable to a transportation application.

U.S. Pat. No. 3,937,148 (Virtually zeros power linear magnetic bearing; Inventor: Paul A. Simpson; Issued: Feb. 10, 1976) shows how the preceding patent can be used for transportation applications but requires separate electromagnets and does not address the guidance and propulsion.

The patents described above indicate the importance of the objectives of the patent disclosed here, but they leave out important ingredients.

In view of the foregoing, an object of this invention is to provide improved methods and apparatus for magnetic levitation ("maglev"), and more particularly, for suspending, guiding and/or propelling vehicles using magnetic forces.

Yet another object is to provide such methods and apparatus as result in reduced vehicle weight so that guideway, suspension and propulsion costs can be reduced.

Still another object is to provide such methods and apparatus as can operate, inter alia, with short headway and high speed so as to reduce both waiting time and travel time.

A related object is to provide such methods and apparatus as are economical to build.

SUMMARY OF THE INVENTION

The foregoing are among the objects attained by the invention which provides, in some aspects, magnetic levitation apparatus that employ a single magnetic structure—or, where desired, multiple structures—to provide vertical suspension forces, lateral guidance forces, and a longitudinal propulsive force. In one aspect of the invention, the magnetic structure(s) include(s) a magnet that provides suspension. According to one preferred practice of the invention, this can be a permanent magnet. Coils, wrapped about the magnet (or otherwise disposed adjacent thereto), control that suspension, e.g., so that it is stable in all desired directions.

According to related aspects of the invention, the aforementioned coils are excited by currents that control the magnetic gap—for example, so that the weight of the vehicle is equal to the attractive force of the magnets. Those control currents can be generated, e.g., by a feedback control system, to provide active damping of heave, pitch, yaw, roll and/or sway.

In still further aspects, magnetic levitation apparatus as described above applies the control currents so as to create forces countering any perturbation that would cause the magnet gap to vary from this desired value.

Yet other aspects of the invention provide magnetic levitation apparatus as described above in which the magnets are staggered. This permits use of the same control coils to provide active control of lateral motion.

Still further aspects of the invention provide magnetic levitation apparatus as described above arranged with gaps up to twice as large (or larger) than practical with prior art systems.

Still yet further aspects of the invention provide magnetic levitation apparatus as described above in which superconducting magnets are used instead of (or in addition to) the aforementioned permanent magnets. In related aspects of the invention, those superconducting magnets can operate in the persistent mode with no need for control of the superconducting current.

Yet still further aspects of the invention provide vehicles that utilize magnetic levitation apparatus as described above. These can be, for example, people-movers, baggage carriers or other moving devices that operate with short headway.

Systems and methods according to the invention are advantageous in many regards. Among these, is that they offer high acceleration so that high operating speed is possible even when there are frequent stops and a need for negotiating tight turns at lower speeds.

Other aspects of the invention provide methods for operating people-movers, baggage carriers and other magnetic levitation apparatus paralleling the functions described above.

DETAILED DESCRIPTION OF THE ILLUSTRATED EMBODIMENT

Systems according to the invention can use one magnetic structure to provide suspension, propulsion and guidance. In one embodiment, the suspension can lift about ten times the weight of the magnet structure and the integrated propulsion system can operate with an average efficiency of 90% or more. A transportation system using this suspension, propulsion and guidance can have lighter vehicles, consume less energy and still have the advantage of known maglev designs, e.g., reduced noise, higher top speed, higher acceleration and lack of maintenance associated with wheel-based systems.

Choice of Dimensions

Figure 1:
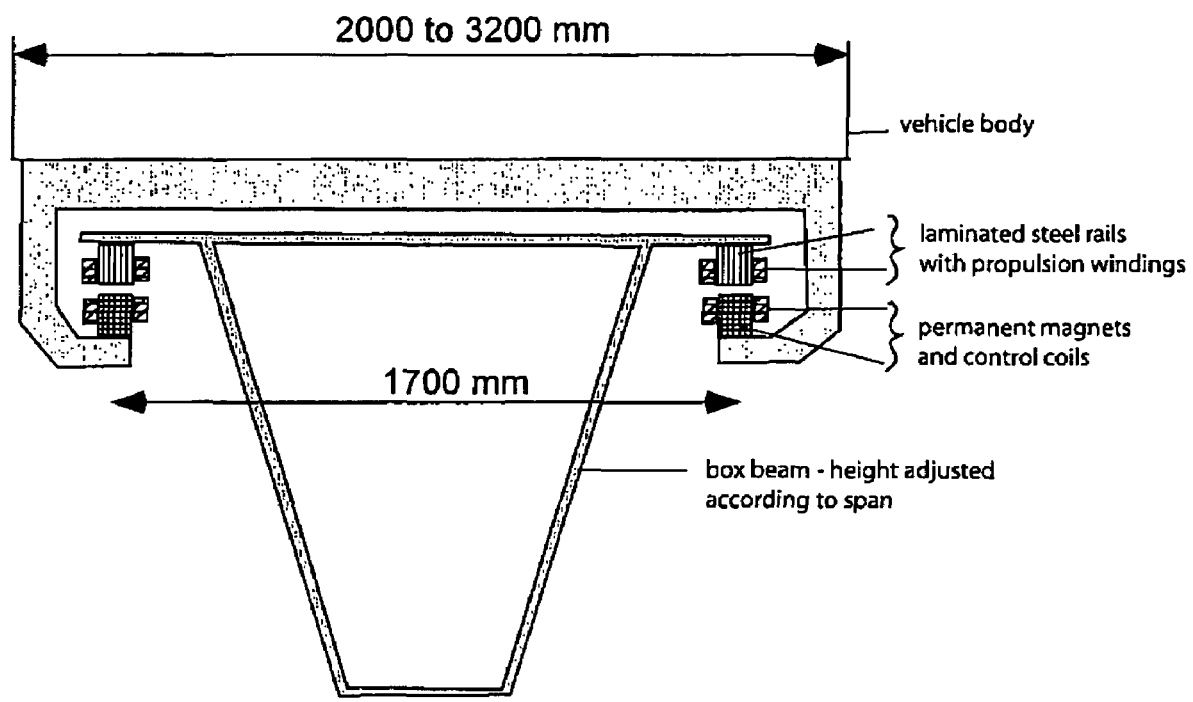
FIG. 1 depicts a cross section of a maglev guideway and suspension system according to the invention in which each side of the vehicle has magnet modules that provide combined suspension, guidance and propulsion.

FIG. 1 shows a cross-section of the baseline suspension design in a system according to the invention. The vehicle is supported by a string of magnets on each side and these magnets create attractive forces to the laminated steel rails on the guideway. The dimensions shown in FIG. 1 were chosen with several factors in mind, e.g.,

- The vehicle width should be adaptable at least over the range 2.0 to 3.2 meters (6.6 to 10.5 feet) in order to accommodate various applications. This range includes the width of vans, buses and trains with the larger widths best for higher speeds and higher capacities and narrower widths best for lower speeds and lower capacities.
- Maglev vehicle weight is expected by the marketplace to be about 0.9 tonne (0.9 Mg or 2,000 lbs.) per meter of length, depending on load. In the illustrated embodiment, assuming the magnet pods extend most of the length of the vehicle, each pod must support about 0.5 tonnes per meter. Again, in the illustrated embodiment, this is achieved using readily available permanent magnets with a magnetic gap of about 20 mm and steel rails that are about 80 mm wide (though magnets of other types, gaps and rails of other sizes, and rails of other materials can be used).
- The same magnets that provide lift should preferably also provide guidance. The lateral guidance force requirement can be as large as 0.4 g, for instance, under worst-case conditions of turning and high wind. The inventors have realized this can be achieved if the steel rails on the guideway are about 4 times as wide as the nominal magnetic gap. This is consistent with a 20 mm magnetic gap and 80 mm wide rails, for example, discussed above.

The center-to-center spacing of the steel rails is chosen to be 1700 mm in the illustration, somewhat greater than for a conventional railroad for which the spacing is 1435 mm between the inside edges of the rails.

The dimensions of other embodiments may differ, as appropriate to their applications. For example, for a low speed Group Rapid Transit (GRT) application, it might be appropriate to use a narrower rail gauge and for very high speeds or heavy loads it might be desirable to use wider steel rails with higher loading per meter of guideway.

Choice of Pole Pitch and Magnet Size

Figure 2A:
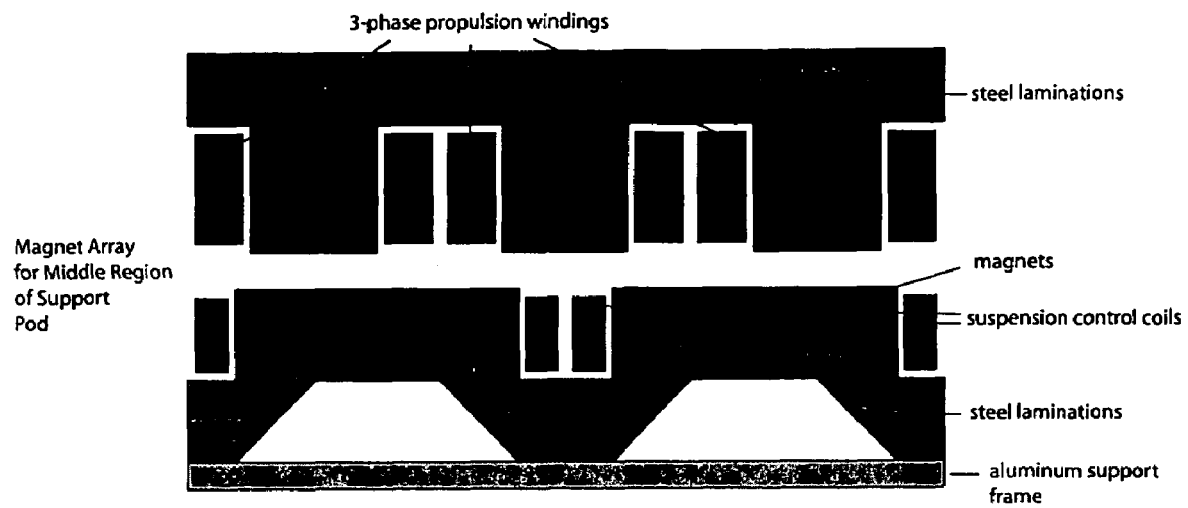
FIG. 2a depicts a side view of portions of the magnet modules and structure for a midsection of the system of FIG. 1.

A side view of the suspension of FIG. 1 is shown in FIG. 2a. The magnetic field repeats itself with a spacing called the wavelength. The optimum value of wavelength can vary over a wide range according to the requirements for vehicle size, speed, weight and acceleration. For the dimensions shown in FIG. 1, a good choice is to make the wavelength equal to about 0.5 meters (though other sizes can be used as well). This leads to propulsion coils that are approximately square in cross section and gives an acceptably small propulsion winding inductance. With a 0.5 meter wavelength and a vehicle speed of 45 m/s (101 mph) the linear synchronous motor (LSM) excitation frequency is 90 Hz. Embodiments with longer wavelengths may employ more back iron in the stator rails and for the vehicle magnets (which may increase guideway cost and vehicle weight). Embodiments with shorter wavelengths may have a higher excitation frequency (which may increase eddy current losses and problems with winding inductance).

Figure 2B:
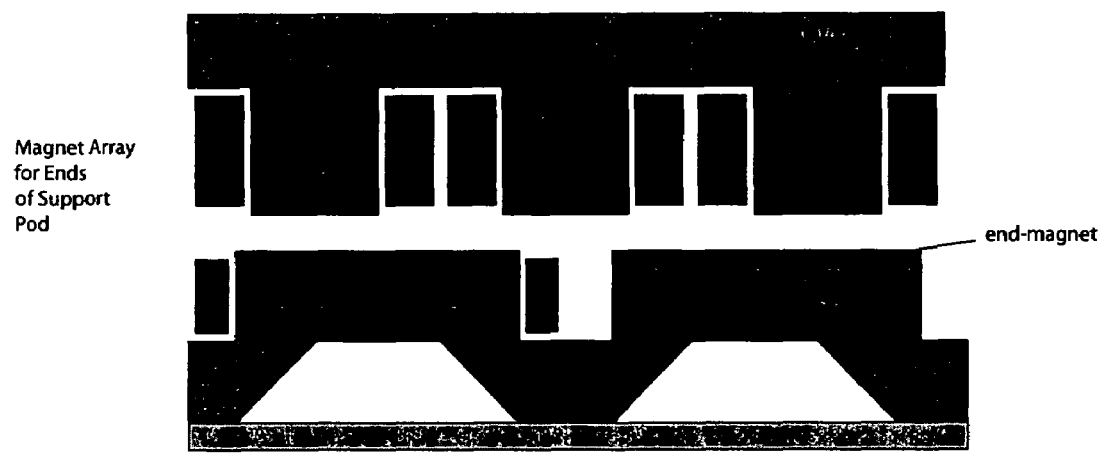
FIG. 2b depicts an end section of the system of FIG. 1 that equalizes the magnetic flux and mitigates cogging.
Figure 3:
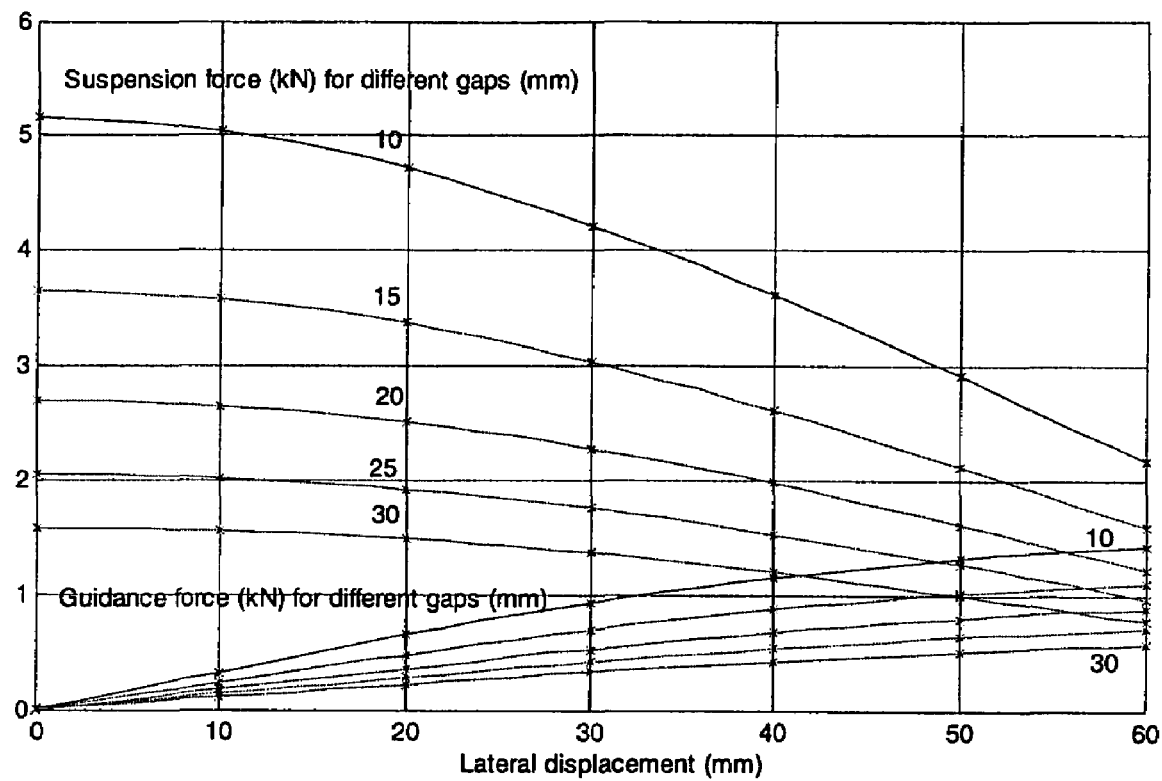
FIG. 3 depicts suspension, guidance and propulsion forces for a 1-wavelength section of the magnet pods shown in FIGS. 2a and 2b for the case of an 80 mm wide rail.

FIG. 3 is a graph depicting the suspension and guidance force as a function of lateral displacement for a 1-wavelength (0.5 meter) section of vehicle magnets and for an 80 mm rail width, for a system such as described above. This graph was generated for magnets with an energy product of 40 mega Gauss Oersted (MGO) using 3D finite element analysis with periodic boundary conditions. The normal operation is with 20 mm vertical displacement and zero horizontal displacement and then the suspension force is 2,700 N per wavelength, as shown in the graph. The suspension will then support 550 kg of mass per meter of length of the magnet pods. The 2 half-magnets on the ends of the pods will produce additional lift of 630 N total for magnets with the dimensions and locations shown in FIG. 2b. Four pods, each with a length of 3 meters, will then lift 6,700 kg, the approximate mass of a normally loaded (i.e. 75% of the seats filled), small bus size vehicle.

In the illustrated embodiment, the stator is dimensioned as discussed in the patent application entitled "Synchronous Machine Design and Manufacturing," filed this same day herewith, which claims the benefit of priority of same-titled application 60/326,278, filed Oct. 1, 2001, both assigned to the assignee hereof, the teachings of which are both incorporated herein by reference.

In order to minimize inductance and simplify the propulsion winding, the winding slots in the stator have vertical sides without any pole tips extension. To minimize cogging force, the longitudinal length of the magnets can be chosen as discussed in the incorporated-by-reference application. For example, with three slots per wavelength if the slot width equals the tooth width then the magnet length that minimizes cogging is either 0.45 or 0.77 times one half of the wavelength. For a 500 mm wavelength the optimum magnet lengths are about 112 mm or 186 mm. Both of these choices will give very little cogging with the shorter magnet giving only 70% as much suspension force (hence, the longer magnet is normally a better choice). To minimize cogging in view of edge effects that depend on rail width, a magnet length of 186 mm is a good choice for the dimensions above.

The slot width can be varied over a wide range but by making the slot width equal to the tooth width, the stator laminations can be fabricated without any scrap. In some embodiments it may be desirable to vary the relative winding slot width to achieve a desired effect; this may also necessitate using a different magnet length for minimum cogging.

The height (i.e. thickness) of the magnets is chosen to be about 25% more than the air gap or 25 mm when the gap is 20 mm. A higher magnet would give more attractive and propulsive force but would entail the use of more ampere-turns in the control coil and increased magnet weight. A smaller value would reduce the attractive force and decrease the propulsive force. The choice of 25% appears to be near optimum for some applications.

The control coil height needs to be greater than the magnet height in order to reduce resistive power loss in the winding to acceptable levels during takeoff. By placing the magnets on pedestals it is possible to do this. A control coil height of 40 mm is a good compromise, for some applications, between adding excessive weight and creating excessive power dissipation.

Magnet Type and Configuration

With present technology, a good choice for magnet material is Neodymium-Iron-Boron (NdFeB). In selecting among grades, preferably maximum energy product and coercive force required for demagnetization are evaluated at the maximum possible operating temperature. The illustrated embodiment uses material with an energy product rating of 40 MGO and with the stipulation that they do not substantially demagnetize when the flux is driven to 0 at a temperature of 50° C. NdFeB magnets with an energy product in excess of 40 MGO may also be used, though, with currently available materials, they tend to demagnetize more easily. In selecting materials for some embodiments of the invention, the objective is to ensure that when the control current reduces the flux to the level required to increase the gap when the gap is at a minimum there is sufficiently little demagnetization of any significant portion of the magnet. A different magnet configuration, such as a Halbach Array can be used in other embodiments, but this does not materially affect the design.

End Magnets

In systems according to the invention, the vehicle magnet array is typically only a few wavelengths long. The following are preferably taken into account when determining end magnet arrangement.

1. The magnets preferably terminate the magnetic flux from the periodic part of the array so that those magnets create a stator flux that is very similar to what it would be if the vehicle array were very long.
2. If the periodic array does not cause any cogging force then the end magnets should preferably not cause cogging.
3. The end magnets should preferably not create excessive pitching forces on the array.

In some embodiments this results in configurations in which

1. The magnets are approximately as long as the regular magnets but with reduced height. Their size and placement is chosen so that half of the flux from neighboring magnets goes in each longitudinal direction.
2. The length and spacing of the end magnets is selected so there is no cogging.
3. An even number of magnets is used in the periodic array and a carefully calculated size and placement is used so that there is very little pitching force created by the end magnets.

Figure 4:
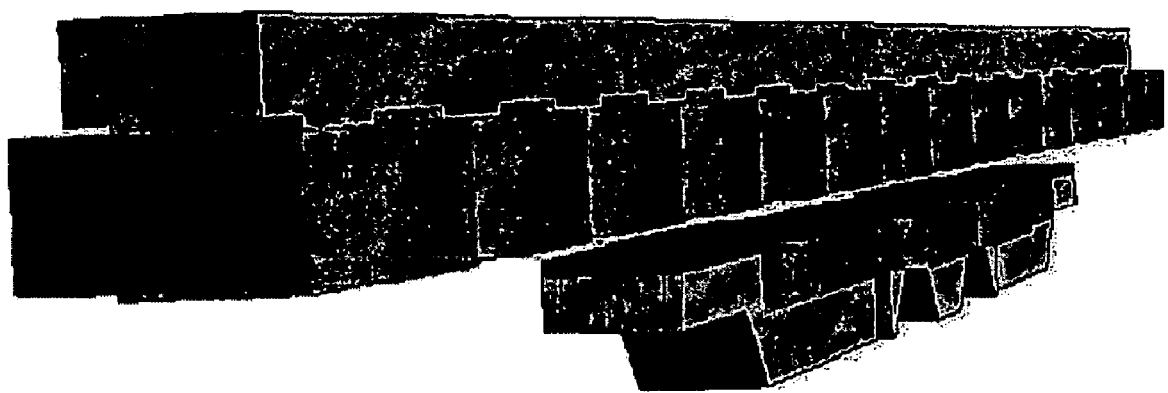
FIG. 4 is a three dimensional drawing of (a) a short stator section according to the invention showing stator lamination with propulsion winding, and (b) a vehicle magnet pod with controllable magnets in the middle and with special end magnets that equalize the flux and minimize cogging and pitching forces.

The relative dimensions shown in FIG. 2b were chosen according to this criterion. A magnet pod with four full magnets and the two end magnets is shown in FIG. 4.

In FIG. 2b, the end magnets are not full height and do not have control coils. The reduced height reduces the attractive force when the magnet gap is small and this reduces the peak current required in the control coils. In some embodiments, a control coil is placed around the end magnets. A design of the end magnets could be quite different if the magnet array is very short or if higher suspension force is required, and such is envisioned herein.

Suspension Control

In systems according to the invention, varying the current in the coils wound around the suspension magnets controls the vertical suspension forces. Two objectives of the control are:

1. Convert an unstable equilibrium point into a stable equilibrium point.
2. Adjust the magnetic gap to the value that minimizes power dissipation in the control coils.

The control system that accomplishes these tasks is typically constructed as two separate feedback control loops. A fast loop, using gap and acceleration sensors, provides the stabilization and a slower loop, using current sensors, minimizes control current.

The stabilization is used because a system of static electromagnets is inherently unstable in at least one degree of freedom. The design described here is unstable in the vertical direction but stable in all other directions. In typical operation, if the magnetic gap is designed to be 20 mm with a nominal load, then the length of the pods will be chosen such that 20 mm is the equilibrium point when the suspension magnet force closely matches the load force with little if any current in the control coils. If the load increases, then the fast response part of the control system immediately applies a control current to counteract the increased load and then, over time, the zero-power control loop causes the suspension gap to decrease so that little if any control current is required at near equilibrium. A typical vehicle might have a load that varies approximately ±20% about a nominal value. This will then imply (see FIG. 3) that the magnetic gap varies about ±3 mm from its nominal value with the heavier load requiring the smaller gap.

Figure 5:
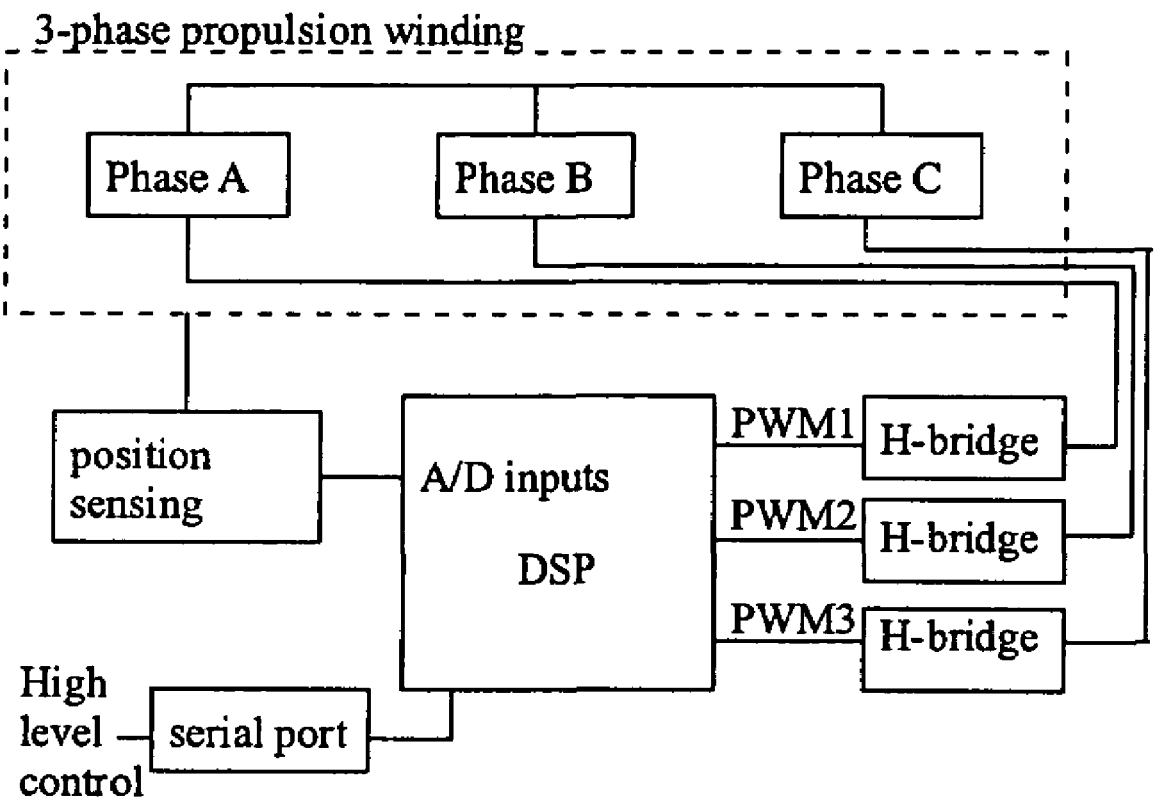
FIG. 5 is a block diagram of a suspension control system according to the invention.

FIG. 5 is a simplified block diagram of the control system for a typical pod according to the invention. The pod can have any number of control coils, here designated n, each controlled by an H-bridge, which is, in turn, controlled by a digital signal processor (DSP). Gap and acceleration sensors at each end of the pod provide the sensor input needed to maintain a stable gap. In practice there can be more than one processor so that there is redundancy in case of failure of the control system.

LSM and Its Control

Figure 6:
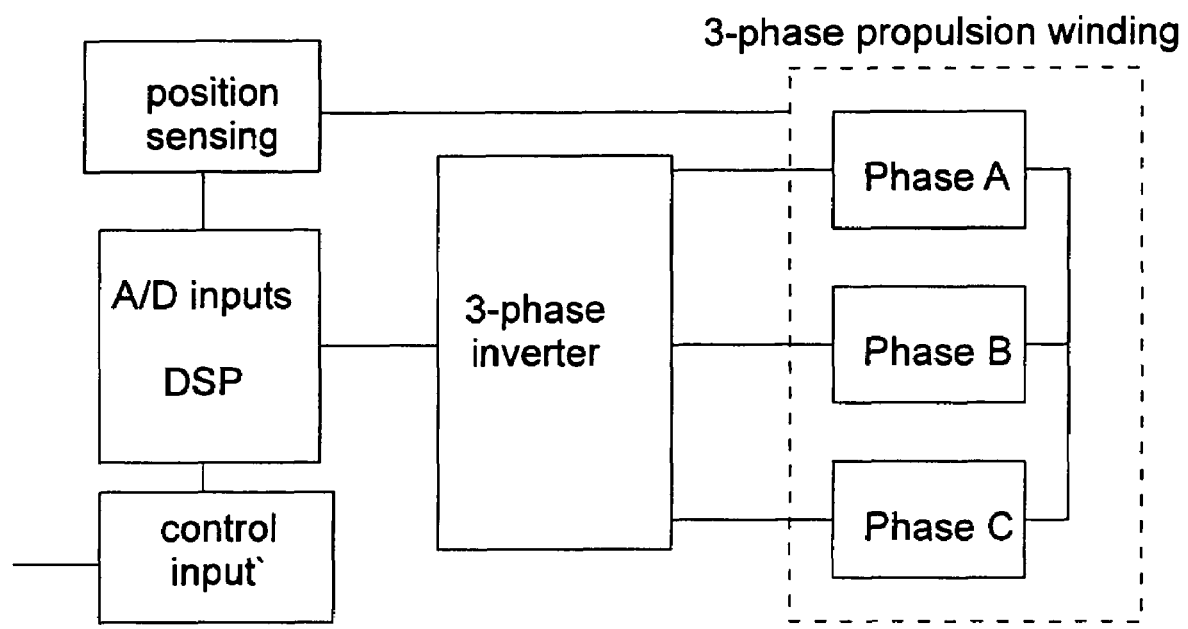
FIG. 6 is a block diagram of a linear synchronous motor (LSM) control system according to the invention.
Figure 7:
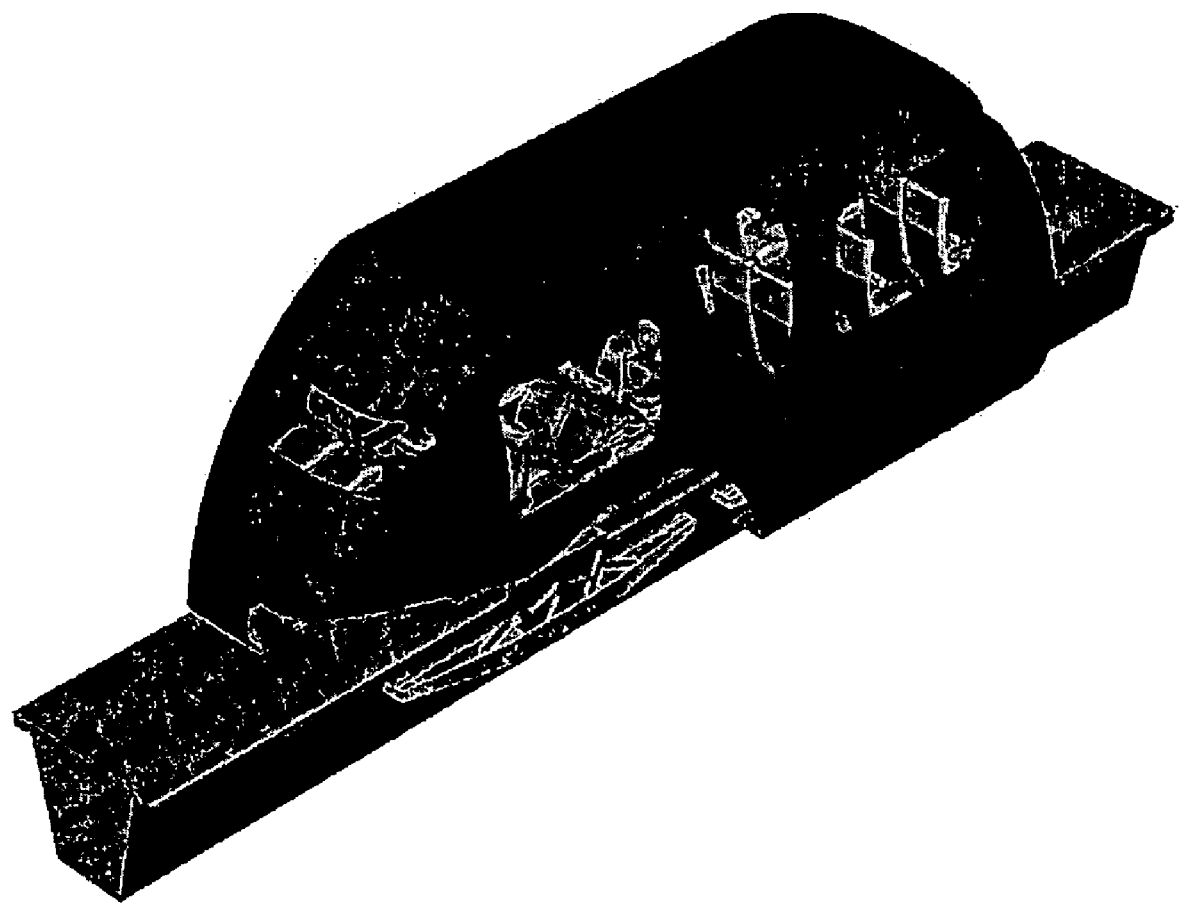
FIG. 7 depicts a vehicle according to the invention with four pods that pivot in two dimensions in order to allow negotiating horizontal and vertical turns.
Figure 8:
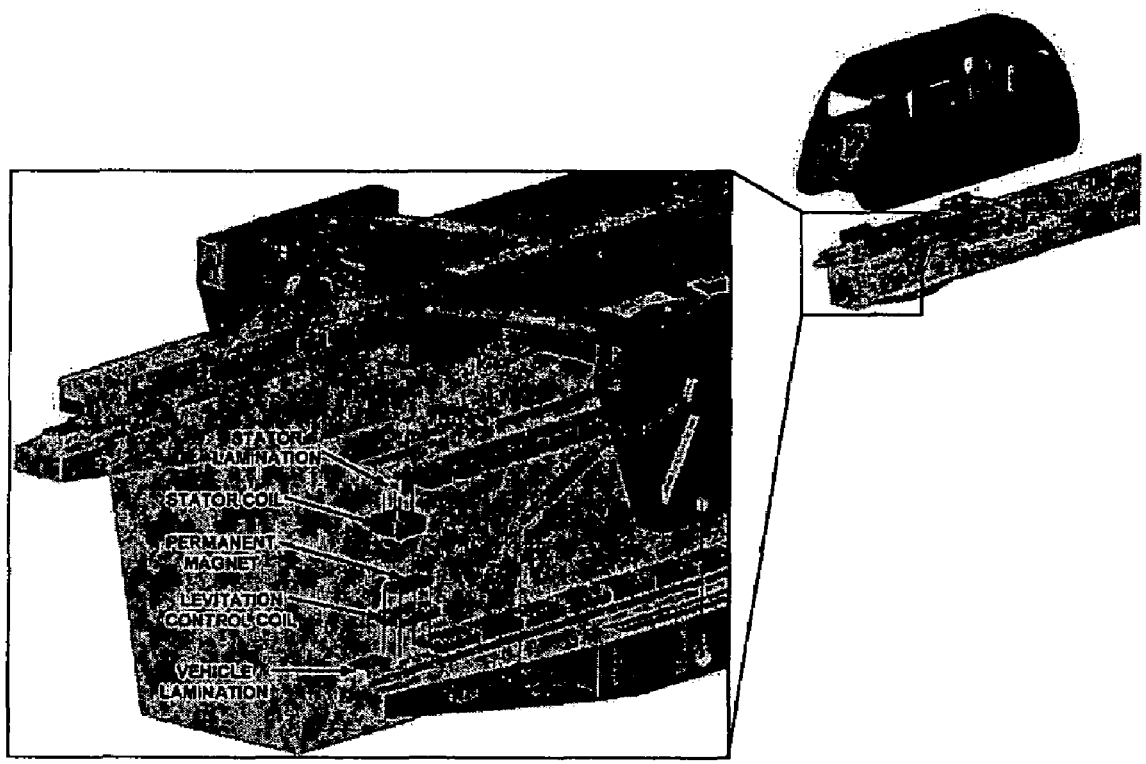
FIG. 8 shows how the magnet pods, such as those illustrated in FIG. 7, can be attached to a vehicle according to the invention. The figure also shows optional mechanical mechanisms according to the invention that damp oscillations of the pods with respect to the vehicle.

The linear synchronous motor (LSM) of the illustrated embodiment is based on that described in the aforementioned incorporated-by-reference applications (U.S. Ser. No. 60/326,278 and its sane-titled successor filed this same day herewith) or can use other designed methods (prior art or otherwise). Preferably, the LSM and suspension design is selected such that there is enough lateral force to eliminate the need for an additional magnetic structure to provide guidance. If the gap is small this may entail splitting a suspension rail into two or more parts, each of which provides guidance, e.g., in the manner of the Japanese HSST maglev system. The LSM can be controlled by a microprocessor driving a multiphase inverter as shown in the control system block diagram in FIG. 6.

Position sensing in the illustrated embodiment is achieved as described in U.S. Pat. No. 6,011,508, Accurate Position Sensing and Communications for Guideway Operated Vehicles, the teachings of which are incorporated herein by reference; other mechanisms (known in the art or otherwise) can be used as well. The position sensing system is integrated into the LSM and this controls the switching of the inverters. When the required thrust is low it is preferable to operate the inverter so that the current is in phase with the motor back-voltage and the sign of the current determines whether the motor is providing forward or reverse thrust. Operating in-phase minimizes power dissipation in the LSM winding.

For typical applications of the illustrated system, the inductance of the LSM is quite large and when the thrust is large the LSM control must adjust the phase angle between motor back voltage and current so as to get the required thrust and speed with the least amount of power dissipation in the winding. In this case the current and back voltage will not be in phase and the control is more complex. This situation is not common in rotary motors because they usually have a small air gap and field magnets exciting all of the windings, so the per-unit inductance is not as large.

Damping of Lateral Force

Figure 9:
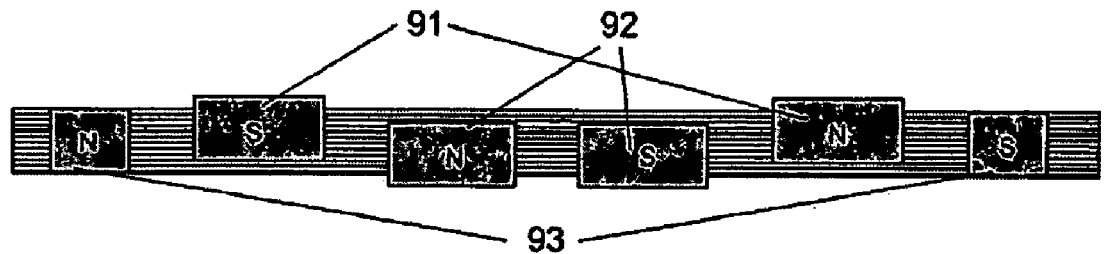
FIG. 9 shows how in a system according to the invention magnets can be offset relative to the suspension rail in order to allow the suspension control system to damp lateral oscillations.

The design shown in FIGS. 1, 2a and 2b creates enough lateral force to allow negotiating turns and resisting lateral wind force. In order to provide damping of that lateral force, pairs of magnets are offset as shown in FIG. 9, which is a top view of a short magnet pod according to the invention with 4 full-length magnets 91 and 92 and 2 end magnets 93.

An offset that produces only a small decrease in vertical suspension force can be used to create a substantial lateral force. For example, if the control coils increase the force of the coils (and magnets) offset in one direction and decrease the force of the coils (and magnets) offset in the opposite direction, then there can be a net lateral force with no change in vertical force. By using sensors to detect lateral motion of the magnets relative to the rails it is possible to control these currents so as to damp oscillations. The control will not attempt to provide the lateral guidance force, only to damp oscillations associated with the lateral motion resonances.

When magnets are mounted on pods and several pods are used to support a vehicle it is possible to use the lateral force to damp several types of motions. For example, sway is the side-to-side motion of a vehicle and roll is the rotational movement of a vehicle about its longitudinal axis. These two modes are coupled because any lateral force exerted by a suspension magnet underneath the vehicle will create both sway and roll. By controlling both vertical and lateral magnetic forces it is possible to damp both sway and roll.

Yaw is the rotational movement of a vehicle about its vertical axis and this can be damped by applying lateral force to the front pods that is in the opposite direction to a lateral force applied to the rear pods. These lateral forces, which are applied under the vehicle, can produce small amounts of roll that must be damped as described above.

In many cases it will also be desirable to add mechanical damping of one or more degrees of freedom. However, for a low speed system it may be possible to eliminate all or most mechanical damping and use only magnetic forces for control.

Use of Superconducting Magnets

In one embodiment according to the invention, superconducting magnets can be used in addition to or instead of permanent magnets. This can be done, for example, by controlling the current in the superconducting coils to stabilize the gap or operating the superconducting coils in persistent current mode and using an external control coil as has been described for the case of a permanent magnet suspension. The latter approach has an advantage that the super-conducting magnets can be greatly simplified.

Figure 10:
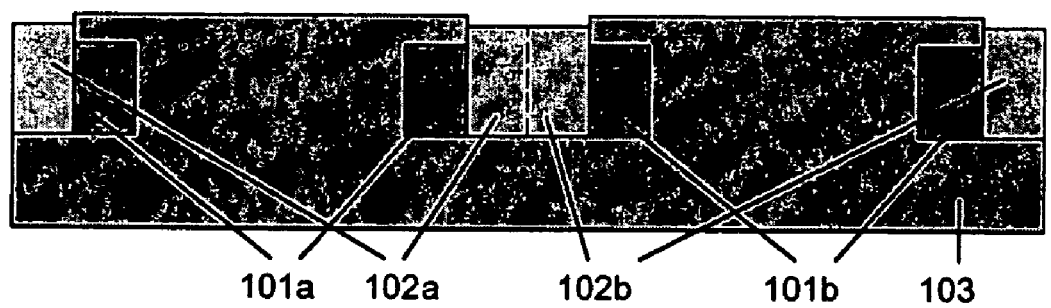
FIG. 10 depicts a system according to the invention in which the permanent magnets are replaced by superconducting magnets.

A preferred method of using superconducting magnets is to replace the permanent magnet structure with a structure similar to the one shown in FIG. 10. Here the superconducting coils 102a and 102b, can be constructed with high temperature superconductors, and are wound around laminated steel poles 103 with pole tips 104 used to distribute the flux in such a manner as to minimize cogging forces. The use of a steel core for the coils has a benefit of reducing the size of superconducting coils required and also reducing the size of the control coils. It also reduces eddy current loss in the superconductors, a loss that is compounded by the fact that it occurs at a low temperature.

In FIG. 10, the superconducting winding can be constructed separately and inserted over the pole tips and control windings.

Use of a Single Overhead Suspension Rail

Further embodiments of the invention use a single overhead suspension rail that supports the vehicle in a manner similar to the way cable cars are supported by an overhead cable. This suspension method has several advantages:

There only needs to be one suspension rail and one propulsion winding so cost can be reduced.

It is easier to design fast-acting switches.

Supporting beams can be smaller and less obtrusive.

For indoor use, such as within an airport, an overhead system might be a good choice. There can be mechanical guide wheels to resist swinging motion when the vehicle is stopped or moving slowly and if there is no wind the swinging motion can be contained. The overhead suspension might also be preferable for use within tunnels. In this case there can be magnets that produce repulsive force to contain swinging motion and the overhead suspension allows for a smaller diameter tunnel and a lower cost suspension and propulsion system.

Scaling

The size of the suspension system according to the invention is well suited to moving people but may not be optimum for moving material. For example, one might want to construct a smaller scale version for use in a clean room, such as in a semiconductor fabrication facility where contamination from a wheel-based suspension can be a problem. Another example is for moving radioactive material in which case the vehicle can operate inside of a closed duct while the propulsion winding is located outside of the duct. The design could also be scaled up by using wider suspension rails to handle more force, or designed for higher speed with a larger gap and longer wavelength. All of these variations are possible and the design principals discussed here are still applicable.

Described above are systems and method achieving the desired objective. It will be appreciated that the embodiments that are illustrated and discussed herein are merely examples of the invention, and that other embodiments employing changes therein fall within the scope of the invention.

We claim:

1. A magnetic suspension system comprising
   a guideway comprising one or more ferromagnetic rails, at least one of which further comprises windings for a linear synchronous motor;
   a vehicle comprising one or more arrays of magnets which:
      effect magnetic attraction forces directed towards at least one guideway rail;
      effect lateral restoring forces on the vehicle; and
      effect longitudinal forces in response to electrical current in one or more of the windings;
   at least one control coil wound around the magnets effecting a substantially stable vertical gap,
   at least one pair of magnets disposed in a lateral offset manner to damp any of sway and yaw forces.

2. A magnetic suspension system according to claim 1, comprising a first control system effective for controlling the coils.

3. A magnetic suspension system according to claim 2, comprising a second control system effective for driving the windings of the synchronous motor.

4. The system of claim 1, further comprising one or more devices disposed on the vehicle effective to damp any of heave, roll, sway and yaw oscillations.

5. The system of claim 1, further comprising a linear synchronous motor effective to produce substantially smooth forces without producing substantial cogging forces.

6. The system of claim 1, further comprising a position sensing system effective to determine the position of the vehicle with respect to the guideway.

7. The system of claim 1, further comprising one or more devices disposed on the vehicle effective to damp any of heave, sway and yaw oscillations.

8. A magnetic suspension system comprising
   a guideway comprising one or more ferromagnetic rails, at least one of which further comprises windings for a linear synchronous motor;
   a vehicle comprising one or more arrays of superconducting magnets, which:
      effect magnetic attraction forces directed towards at least one guideway rail;
      effect lateral restoring forces on the vehicle; and
      effect longitudinal forces in response to electrical current in one or more of the windings;
   a system effective to substantially stabilize a vertical gap,
   at least one pair of magnets disposed in a lateral offset manner to damp any of sway and yaw forces.

9. A system according to claim 8, comprising a winding control system effective to produce acceleration forces.

10. A magnetic suspension system comprising
    a guideway comprising one or more ferromagnetic rails, at least one of which further comprises windings for a linear synchronous motor;
    a vehicle comprising at least one array of superconducting magnets, which:
       effect magnetic attraction forces directed towards at least one guideway rail;
       effect lateral restoring forces on the vehicle; and
       effect longitudinal forces in response to electrical current in one or more of the windings;
    at least one control coil wound around the magnets effecting a substantially stable vertical gap;
    wherein the array of magnets further comprises at least one pair of magnets disposed at a lateral offset,
    a first control system effective for controlling the coils; and
    a second control system effective for driving the windings effective to produce acceleration of the vehicle.

11. A magnetic suspension system comprising
    a guideway comprising one or more ferromagnetic rails, at least one of which further comprises windings for a linear synchronous motor;
    a vehicle comprising one or more arrays of magnets which:
       effect magnetic attraction forces directed towards at least one guideway rail;
       effect lateral restoring forces on the vehicle; and
       effect longitudinal forces in response to electrical current in one or more of the windings;
    at least one control coil wound around the magnets effecting a substantially stable vertical gap;
    wherein the array of magnets further comprises end magnets of a size and location effecting minimal end effects and cogging forces,
    wherein the array of magnets further comprises at least one pair of magnets disposed at a lateral offset.

* * * * *